(12) United States Patent
Anh (10) Patent No.: US 10,041,296 B2
(45) Date of Patent: Aug. 7, 2018

(54) AERIAL-LADDER TRUCK WITH BED EXTENSIONS

(71) Applicant: Chang Ho Anh, Oakland, CA (US)

(72) Inventor: Chang Ho Anh, Oakland, CA (US)

( * ) Notice: Subject to any disclaimer, the term of this patent is extended or adjusted under 35 U.S.C. 154(b) by 0 days.

(21) Appl. No.: 14/578,382

(22) Filed: Dec. 20, 2014

(65) Prior Publication Data

US 2015/0361721 A1 Dec. 17, 2015

Related U.S. Application Data

(63) Continuation-in-part of application No. 14/256,859, filed on Apr. 18, 2014, now Pat. No. 9,598,902.

(51) Int. Cl.
*E06C 5/42* (2006.01)
*E06C 5/04* (2006.01)
*B62D 21/14* (2006.01)

(52) U.S. Cl.
CPC .............. *E06C 5/42* (2013.01); *B62D 21/14* (2013.01); *E06C 5/04* (2013.01)

(58) Field of Classification Search
CPC ........ B62D 21/14; B62D 33/02; B62D 33/08; B62D 33/10; E06C 5/42; E06C 5/04
USPC ............. 296/26.1, 26.11, 26.14, 26.15, 57.1, 296/26.03, 26.08, 26.09, 26.12, 26.13
See application file for complete search history.

(56) References Cited

U.S. PATENT DOCUMENTS

| | | | | |
|---|---|---|---|---|
| 4,347,638 A | * | 9/1982 | Weaver ...................... | B60R 3/02 14/71.1 |
| 4,413,855 A | * | 11/1983 | Flanagan ................... | B60P 3/32 296/162 |
| 4,695,087 A | * | 9/1987 | Hollrock ................. | B62D 33/08 296/100.06 |
| 4,869,030 A | * | 9/1989 | Clark ................... | E04B 1/34336 182/88 |
| 5,775,759 A | * | 7/1998 | Cummins ........... | B62D 33/0273 296/26.11 |
| 5,788,311 A | * | 8/1998 | Tibbals ............... | B62D 33/0273 296/26.11 |
| 5,857,724 A | * | 1/1999 | Jarman ................. | B62D 33/037 296/26.11 |
| 5,902,000 A | * | 5/1999 | Wold .................. | B62D 33/0273 296/26.11 |
| 5,997,073 A | * | 12/1999 | Vanderhoof .............. | B60R 3/02 296/162 |

(Continued)

*Primary Examiner* — Katherine W Mitchell
*Assistant Examiner* — Shiref M Mekhaeil
(74) *Attorney, Agent, or Firm* — Herbt T. Patty, Esq.

(57) ABSTRACT

This disclosure pertains to industrial trucks, and in particular to aerial-ladder trucks with bed extensions. An aerial-ladder truck consistent with the present disclosure includes a cab at a front thereof and a truck bed at a rear thereof. The back end portion of the truck bed includes bed extensions that are slidably coupled in a transverse direction to the back end portion of the truck bed. When the bed extensions are engaged, the width of the truck bed increases by a length that the bed extensions extend from the truck bed. The aerial-ladder truck further includes a ladder turret provided to the truck bed to pass there through. The aerial-ladder truck further includes an extensible post fixedly passing through the ladder turret, an extensible ladder connected to a top portion of the extensible post, and a carrier provided at the top thereof.

16 Claims, 8 Drawing Sheets

(56) References Cited

U.S. PATENT DOCUMENTS

| | | | | |
|---|---|---|---|---|
| 6,102,468 A * | 8/2000 | Lowrey | B60P 3/341 | 296/169 |
| 6,193,294 B1 * | 2/2001 | Disner | B62D 33/0273 | 108/44 |
| 6,502,893 B1 * | 1/2003 | Corliss, Jr. | B60P 3/34 | 296/162 |
| 6,511,092 B1 * | 1/2003 | Chepa | B60Q 1/305 | 280/408 |
| 6,659,497 B1 * | 12/2003 | Owens | A22B 5/06 | 280/415.1 |
| 6,869,092 B1 * | 3/2005 | Henn | B60R 3/02 | 280/166 |
| 7,111,885 B1 * | 9/2006 | Hoffmann | B62D 33/0273 | 296/26.11 |
| 7,165,779 B2 * | 1/2007 | Badger | B60P 3/341 | 280/415.1 |
| 7,628,439 B1 * | 12/2009 | Strong | B62D 33/0273 | 108/44 |
| 7,699,373 B2 * | 4/2010 | Miller | B60P 3/40 | 296/26.09 |
| 7,798,547 B2 * | 9/2010 | Antaya | B05B 15/1214 | 296/163 |
| 7,810,866 B2 * | 10/2010 | Dempsey | B60P 3/341 | 296/169 |
| 8,047,619 B2 * | 11/2011 | Amstutz | A47F 3/002 | 312/117 |
| 8,182,012 B1 * | 5/2012 | Brister | B60P 3/40 | 296/26.11 |
| 8,590,962 B2 * | 11/2013 | Nye | B62D 33/027 | 296/183.1 |
| 8,622,459 B2 * | 1/2014 | Raber | B60P 3/34 | 296/162 |
| 8,757,694 B1 * | 6/2014 | Kuhnle | B62D 33/033 | 296/26.08 |
| 8,857,892 B1 * | 10/2014 | Shockley | B60P 3/341 | 296/169 |
| 9,193,397 B2 * | 11/2015 | Bryant | B62D 33/08 | |
| 2003/0168876 A1 * | 9/2003 | Kiester | B62D 33/08 | 296/39.2 |
| 2005/0093273 A1 * | 5/2005 | McDonell | B60D 1/155 | 280/656 |
| 2005/0168004 A1 * | 8/2005 | Vandewinckel | B62D 33/02 | 296/26.12 |
| 2005/0184546 A1 * | 8/2005 | Kunz | B60P 3/34 | 296/26.01 |
| 2006/0145514 A1 * | 7/2006 | Cardwell | B60P 3/36 | 296/162 |
| 2007/0210599 A1 * | 9/2007 | Arnold | B60P 1/003 | 296/26.09 |
| 2008/0217945 A1 * | 9/2008 | Barnes | B62D 21/14 | 296/26.13 |
| 2009/0284036 A1 * | 11/2009 | Clayton | B60P 3/40 | 296/26.09 |
| 2010/0078955 A1 * | 4/2010 | Smith | B62D 33/02 | 296/26.11 |
| 2011/0260486 A1 * | 10/2011 | Thygesen | B62D 33/02 | 296/26.09 |
| 2013/0341949 A1 * | 12/2013 | Bernthisel | B62D 33/027 | 296/26.09 |
| 2014/0062128 A1 * | 3/2014 | Garchar | B62D 33/0273 | 296/183.1 |
| 2015/0048642 A1 * | 2/2015 | Williams | B60P 1/6427 | 296/26.09 |
| 2015/0225024 A1 * | 8/2015 | Newberry | B62D 33/0273 | 296/26.11 |

* cited by examiner

AERIAL-LADDER TRUCK WITH BED EXTENSIONS

FIELD

This disclosure pertains to industrial trucks, and in particular (but not exclusively), to aerial-ladder trucks with bed extensions.

SUMMARY

This disclosure pertains to industrial trucks, and in particular (but not exclusively), to aerial-ladder trucks with bed extensions. An aerial-ladder truck consistent with the present disclosure includes a cab at a front thereof and a truck bed at a rear thereof. The back end portion of the truck bed includes bed extensions that are slidably coupled in a transverse direction to the back end portion of the truck bed. When the expander surfaces are engaged, the width of the truck bed increases by a length that the bed extensions extend from the truck bed. The aerial-ladder truck further includes a ladder turret provided to the truck bed to pass there through. The aerial-ladder truck further includes an extensible post fixedly passing through the ladder turret, an extensible ladder connected to a top portion of the extensible post, and a carrier provided at the top thereof.

BRIEF DESCRIPTION OF THE DRAWINGS

To facilitate understanding, identical reference numerals have been used, where possible, to designate identical elements that are common to the drawings. The drawings are not to scale and the relative dimensions of various elements in the drawings are depicted schematically and not necessarily to scale. The techniques of the present disclosure may readily be understood by considering the following detailed description in conjunction with the accompanying drawings, in which:

FIGS. 1A and 1B are side views illustrating an aerial-ladder truck, in which FIG. 1A shows a state in which an extensible post is lowered, and FIG. 1B shows a state in which the extensible post is elevated.

DETAILED DESCRIPTION

A detailed description of some embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to some embodiments have not been described in detail to avoid unnecessarily obscuring the description.

This disclosure pertains to industrial trucks, and in particular (but not exclusively), to aerial-ladder trucks with bed extensions. An aerial-ladder truck consistent with the present disclosure includes a cab at a front thereof and a truck bed at a rear thereof. The back end portion of the truck bed includes bed extensions that are slidably coupled in a transverse direction to the back end portion of the truck bed. When the bed extensions are engaged, the width of the truck bed increases by a length that the bed extensions extend from the truck bed. The aerial-ladder truck further includes a ladder turret provided to the truck bed to pass there through. The aerial-ladder truck further includes an extensible post fixedly passing through the ladder turret, an extensible ladder connected to a top portion of the extensible post, and a carrier provided at the top thereof.

Figure 1A:
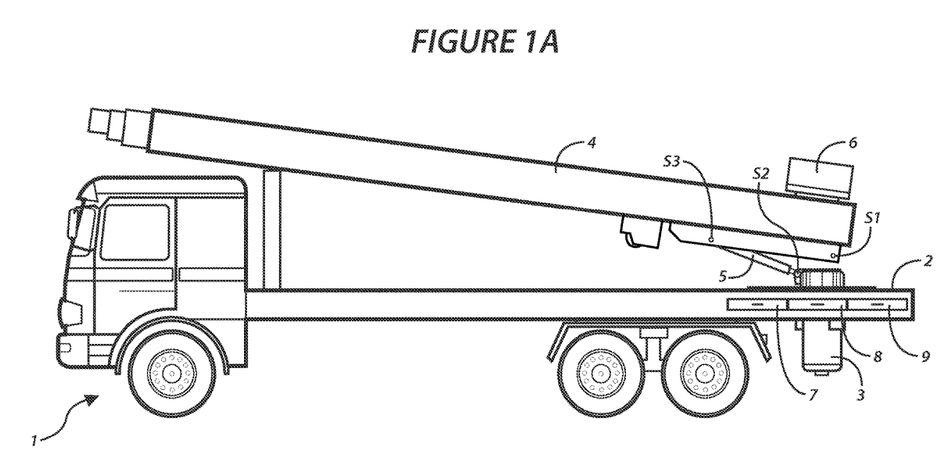
Figure 1B:
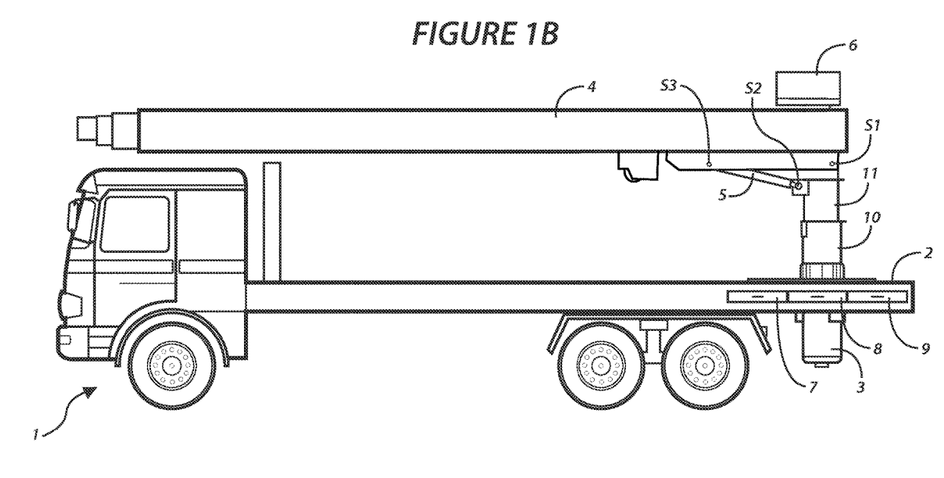

FIGS. 1A and 1B are side views illustrating an aerial-ladder truck consistent with the present disclosure. FIG. 1A shows a state of the aerial-ladder truck 1 in which an extensible post 11 is lowered, and FIG. 1B shows a state in which the extensible post is elevated.

As shown in the drawings, the aerial-ladder truck 1 of the present disclosure comprises a vehicle having a truck bed 12 at the rear thereof; a ladder turret 10 provided to the truck bed 12 to pass there through; an extensible post 11 passing through the ladder turret 10; an extensible ladder 4 having a rear end being connected to the top of the extensible post 11; and an angle adjusting cylinder 5 provided between the extensible post 11 and the extensible ladder 4.

The aerial-ladder truck 1 comprises the truck bed 12, which is provided at the rear thereof, and the left, right and rear sides of the truck bed 12 are open. Most notably, aerial-ladder truck 1 includes bed extensions 7, 8, 9.

Furthermore, the extensible post 11 fixedly passes through the ladder turret 10 to stand upright, wherein the height of the top thereof is adjustable so that the height of the rear end of the extensible ladder 4, which is a connection part of the extensible ladder 4 and the extensible post 1, may be freely adjusted.

As shown in FIGS. 1A and 1B, the rear end of the extensible ladder 4 is connected to the top of the extensible post 11 by means of the first hinge shaft S1, so that the angle thereof may be changed, and a carrier 6 is provided at the top of the extensible ladder 4. The extensible ladder 4 may comprise a lowermost boom provided with the first hinge shaft S1; a plurality of booms telescopically mounted to the lowermost boom; and the carrier 6 moving along the top of the booms.

Furthermore, as shown in FIGS. 1A and 1B, the angle adjusting cylinder 5 has a rear end being connected at the front of the top of the extensile post 3 by means of the hinge shaft S2, and a front end being connected to the bottom of the extensible ladder 4 by means of a hinge shaft S3, thereby serving to change the angle of the extensible ladder 4.

First, when the aerial-ladder truck 1 is driven on a road, a height adjusting cylinder of the extensible post 11 provided at the rear of the truck bed 12 is operated to elevate the elevating pipe thereby increasing the height of the rear end of the extensible ladder 4. Then, as the rear end of the extensible ladder is elevated, the height of the front of the extensible ladder 4 is lowered. Accordingly, the present disclosure may advantageously provide convenience in driving the aerial-ladder truck, by lowering the front height of the extensible ladder 4 as the height of the rear end of the extensible ladder 4, which is the connection end thereof, is increased while driving the aerial-ladder truck 1, so that the height of the truck 1 may not be restricted by a bridge or pedestrian overpass while driving the truck 1.

In addition, the aerial-ladder truck 1 may advantageously prevent the extensible ladder 4 from accidentally falling down while articles are carried in the carrier 6 provided to the extensible ladder 4, by reducing the inclination of the extensible ladder 4 while the extensible ladder 4 is telescopically extended to carry the articles as the height of the rear end of the extensible post 11, which is the connection end thereof, is increased as described. For more information regarding the configuration and utility of extensile post 3, ladder 4, angle-adjusting cylinder 5, carrier 6, and hinge shafts S1, S2, and S3, please refer to U.S. patent application Ser. No. 14/256,859 which is incorporated herein by reference.

Figure 2:
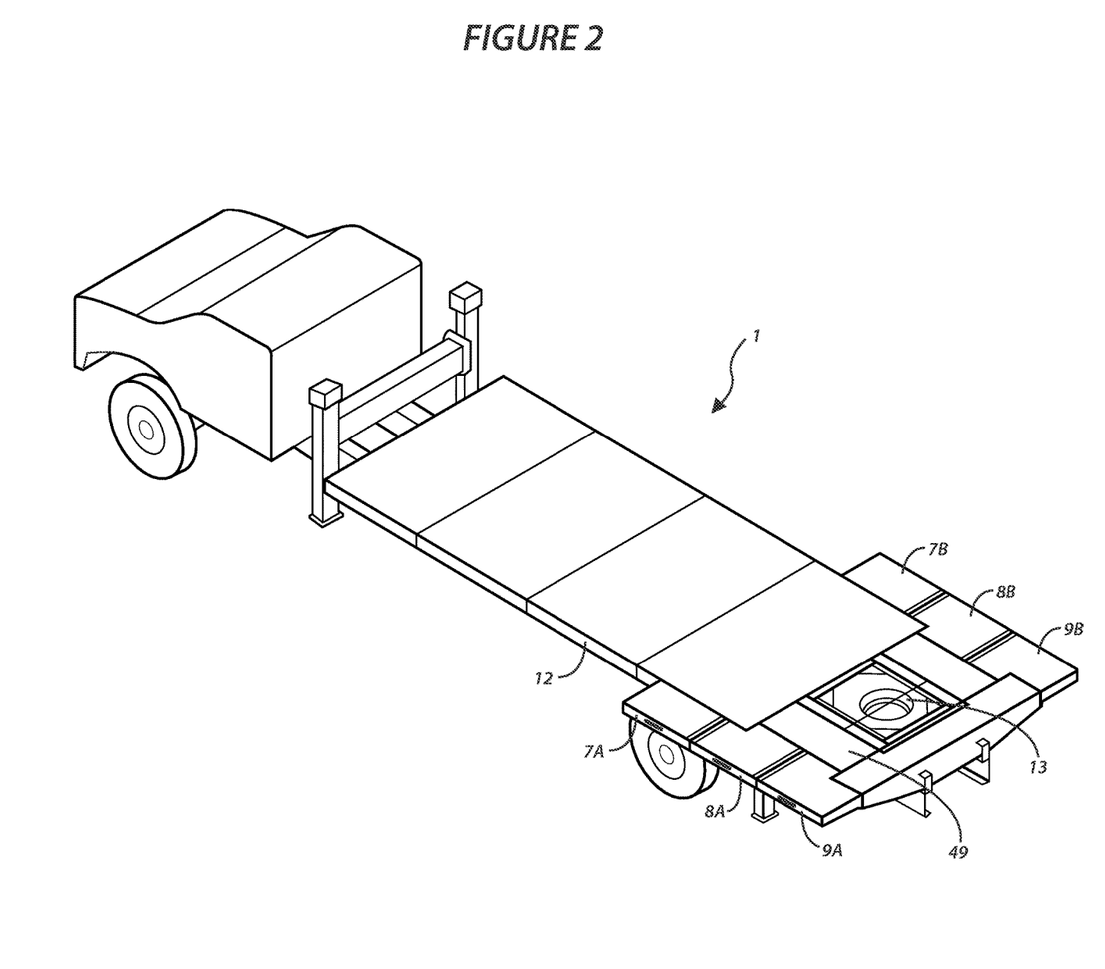
FIG. 2 is a top perspective view of an aerial-ladder truck.

FIG. 2 is a top perspective view of an aerial-ladder truck consistent with the present disclosure. In this figure, a through-hole 13 for the extensible post and a tailgate component of the aerial-ladder truck 1 is disassembled and not shown for the sake of illustrating the manner to which the plurality of bed extensions extend from the truck bed of the truck 1.

As shown in FIG. 2, the aerial-ladder truck 1 may comprise an auxiliary deck unit 49 at the rear of the truck bed 12 and horizontally unfolded to an outer circumference of the rear of the truck bed 12. In some implementations, auxiliary deck unit 49 allows articles to be loaded onto the rear of the truck bed 12 of the aerial-ladder truck 1 so that the articles may not fall therefrom. In addition, the auxiliary deck unit 49 provides truck operators with additional area to move about on the back of the truck 3.

For example, auxiliary deck unit 49 provides convenience in loading or unloading articles onto or from the carrier 6. In some embodiments, auxiliary deck unit 49 comprise two side plates provided at opposing sides of the truck bed 12 such that lower ends thereof are fixedly connected to lateral ends of the truck bed 12 through hinge units (not shown) to allow the side plates to be horizontally unfolded to the outside of both sides.

Most notably, adjacent to the rear end of the truck bed 12 are a plurality of bed extensions 7A, 7B, 8A, 8B, 9A, and 9C (collectively bed extensions 7, 8, 9). The bed extensions 7, 8, 9 may be slidably coupled in a transverse direction to the back end portion of the truck bed 12. When the bed extensions 7, 8, 9 are engaged, the width of the truck bed 12 increases by a length that the bed extensions 7, 8, 9 extend from the back end portion of the truck bed 12. In some embodiments, the bed extensions 7, 8, 9 are on both lateral sides of the truck bed 12. The surface of bed extensions 7, 8, 9 may comprise a suitable material to support a truck operator standing thereon. In some embodiments, the surface of bed extensions 7, 8 comprises aluminum.

In the embodiments shown in the figures, three bed extensions 7, 8, 9 are on both lateral sides of the bed for a total of six bed extensions 7, 8, 9. However, the present disclosure is not limited to any number of bed extensions 7, 8, 9. For example, one, two, three, four, or more bed extensions may be disposed on a single side or on both lateral sides of the truck bed.

Bed extensions 7, 8, 9 may extend a predetermined distance from truck bed 12. The bed extensions 7, 8, 9 may extend from the truck bed 12 in the range of 2-5 fee therefrom. For example, when bed extensions 7, 8, 9 are engaged, the bed extensions extend two feet from the edge of the truck bed 12. However, the present disclosure is not limited to any distance that the bed extensions 7, 8, 9 extend from truck bed 12 and may be any suitable distance so as to provide convenience in loading or unloading articles onto or from a carrier portion (not shown) of the aerial-ladder truck.

Figure 3:
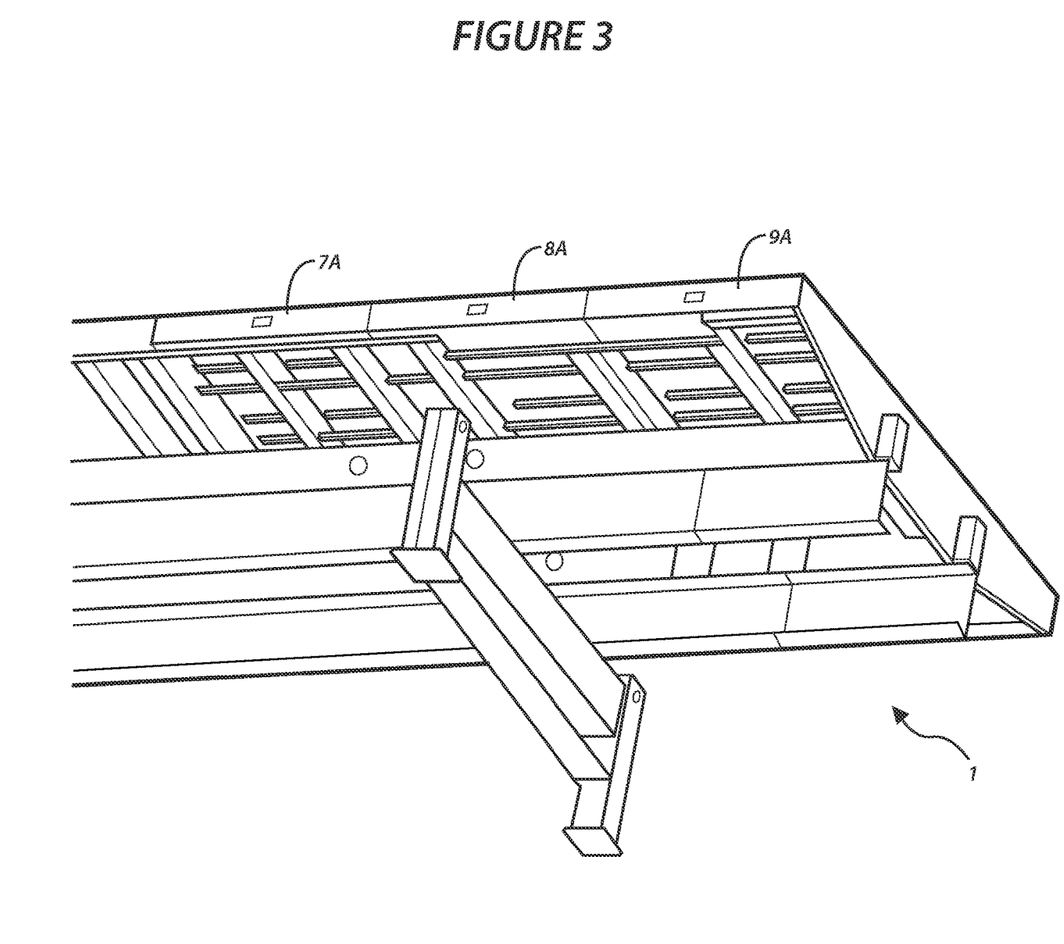
FIG. 3 is a bottom perspective view of a bed portion of the aerial-ladder truck.

FIG. 3 is a bottom perspective view of a truck bed component of the aerial ladder truck 1 (without the back tires of the truck 1). In particular, the bottom of bed extensions 7A, 8A, 9A are shown which expose an exemplary architecture of the bed extensions 7A, 8A, 9A. In some embodiments, each bed extensions weighs in the range of 5-20 pounds such that the bed extensions are durable but not too heavy to deter truck operators from manually extending the bed extensions from the truck bed. It should be understood by one having ordinary skill in the art that the weight of the bed extensions may be outside of the aforementioned range. Furthermore, in yet other embodiments, an actuator may be coupled to the bed extensions to automatically move (e.g., via electric current, hydraulic fluid pressure, or pneumatic pressure) the bed extensions to an extended position.

Figure 4A:
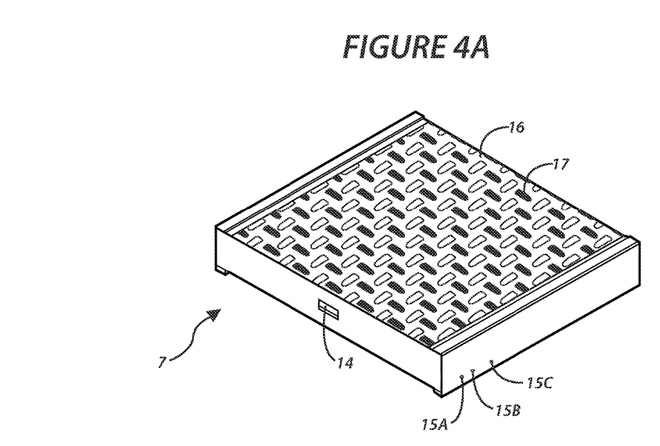
FIG. 4A is an exemplary bed extension.

FIG. 4A is an exemplary bed extension 7 consistent with the present disclosure. Bed extension 7 includes a handle 14 for manual engagement to extend the bed extension 7 from the edge of the truck bed. In some embodiments, handle 14 may include a cavity such that a truck operator can insert their fingers there through to grip an inside surface of the bed extension 7. In addition, bed extension 7 includes a plurality of ridges 17 disposed on the top surface 16 to enable a truck operator to get a better grip on the bed extension 7.

Furthermore, bed extension 7 includes a locking mechanism wherein when engaged, allows the bed extension 7 surface to extend from a side of the bed extension 7. Furthermore, when the bed extension 7 is disengaged, the locking mechanism restricts the bed extension 7 from extending from the bed extension 7. In some embodiments, the locking mechanism includes a set of pins 15A, 15B, 15C which cooperate with a set of cavities disposed along the side of the extension sleeves (see FIG. 4B).

Figure 4B:
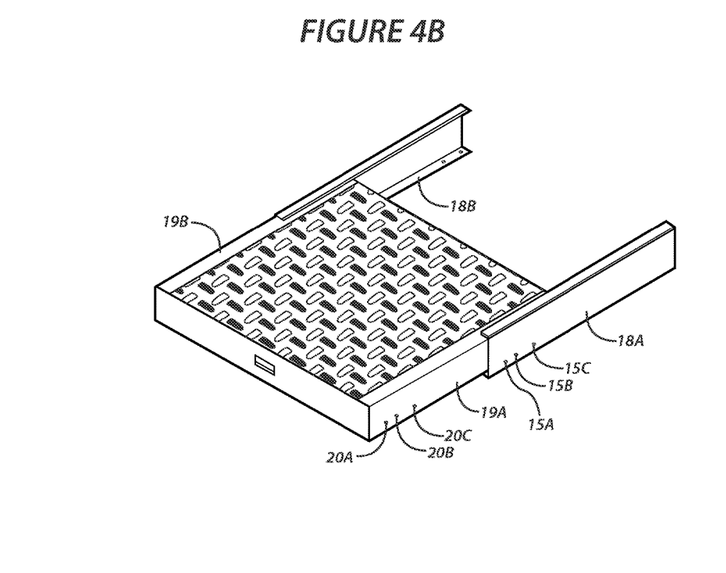
FIG. 4B is an exemplary bed extension in an extended position.

FIG. 4B is an exemplary bed extension 7 in an extended position. In the extended position, the set of pins 15A, 15B, 15C of the locking mechanism disposed along the sides 19A, 19B of the bed extension 7 are exposed. In addition, the cavities 20A, 20B, 20C disposed on the extension sleeves 18A, 18B are also exposed to show where the pins 15A, 15B, 15C couple thereto.

Figure 4C:
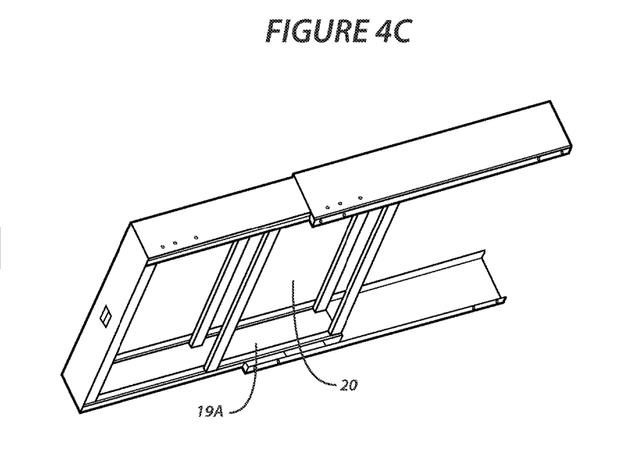
FIG. 4C is a bottom perspective view of an exemplary bed extension in the extended position.

Finally, FIG. 4C is a bottom perspective view of an exemplary bed extension 7 in the extended position. As shown, the figure exposes an inside surface of the side 19A and surface 20 of the bed extension 7.

Figure 5:
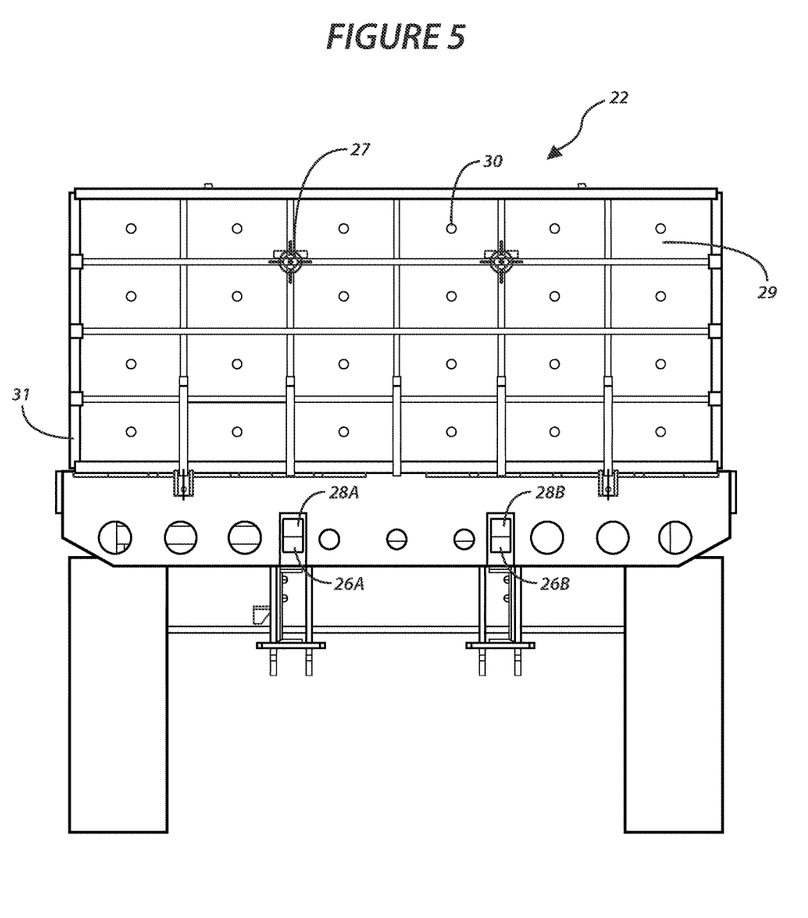
FIG. 5 is a back view of a tailgate component of an aerial-ladder truck bed.

FIG. 5 is a back view of a tailgate component 22 of a truck bed 12 consistent with the present disclosure. Notably, tailgate 22 prevents items stored on the truck bed 12 from falling off the aerial-ladder truck. Tailgate 22 may have a plurality of sections 29 and a plurality of holes 30 (which allow air to flow there through to reduce the force on the tailgate 22 when the aerial-ladder truck is moving). Most importantly, tailgate 22 may feature one or more surface coasters 27 which creates separation from one or more stoppers 26A, 26B when the tailgate 22 is in an open position. Stoppers 26A, 26 may extend from openings 28A, 28B on a bottom portion of truck bed 12.

Furthermore, tailgate 22 includes a pair of hinges 31A which allow a set of collapsible lateral surfaces to open or close as will be further described below.

Figure 6:
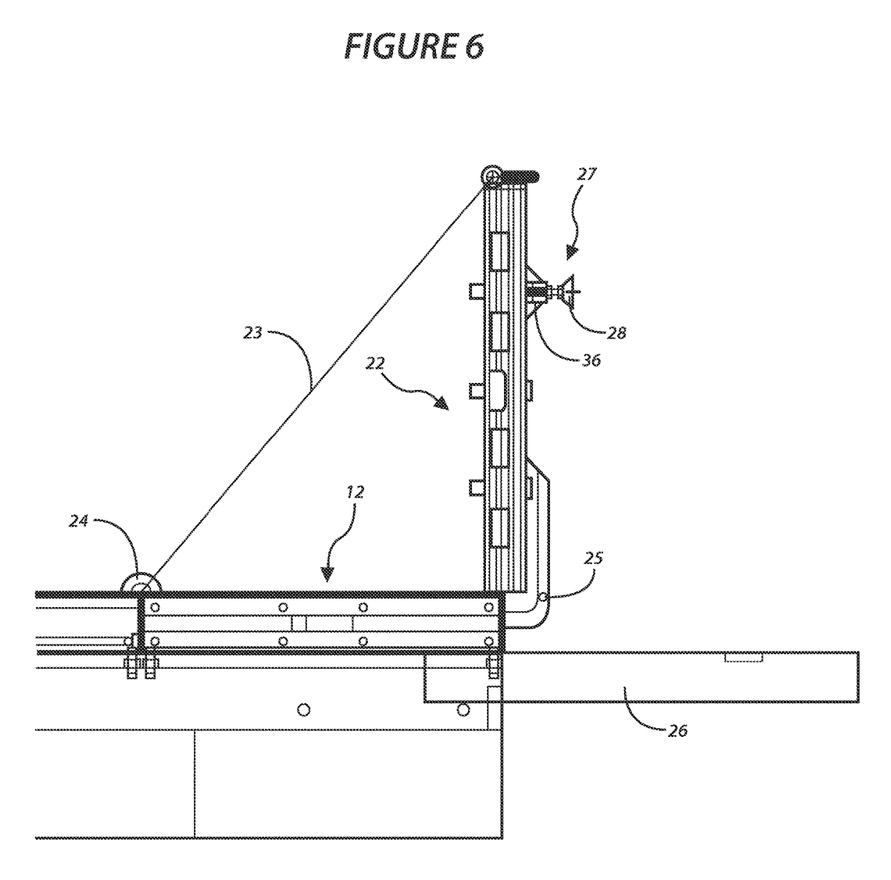
FIG. 6 is a side view of the tailgate component of the aerial-ladder truck bed in a closed position.

FIG. 6 is a side view of the tailgate 22 in a closed position. Tailgate 22 may have one or more accessories to enhance the tailgate's 22 functionality. As previously described, tailgate 22 may have a cable 23 (having a dampener attached thereto—not shown) extending to an anchor point 24 disposed on a surface of the truck bed 12.

In addition, FIG. 6 shows a side view of a surface coaster 27 disposed on the back surface of tailgate 22. In some embodiments, surface coaster 27 may include one or tailgate guards 26 coupled to the tailgate 22 via a mechanical coupling (e.g., fasteners) 28.

Tailgate 22 also includes a hinge 25 which allows the tailgate 22 to assume an open and closed position as known in the art. Most notably, when the tailgate 22 is open and parallel to the truck bed, the surface coaster 27 may make contact with one or more door stoppers 26 when the door stoppers 26 are in an extended position. As such, door stoppers 26 can provide support for a truck operator while loading and unloading cargo on the truck bed. Moreover, the physical support provided by the tailgate 22 and door stopper(s) 26 enables truck operators to utilize the area of the tailgate 22 of the aerial-ladder truck.

Figure 7A:
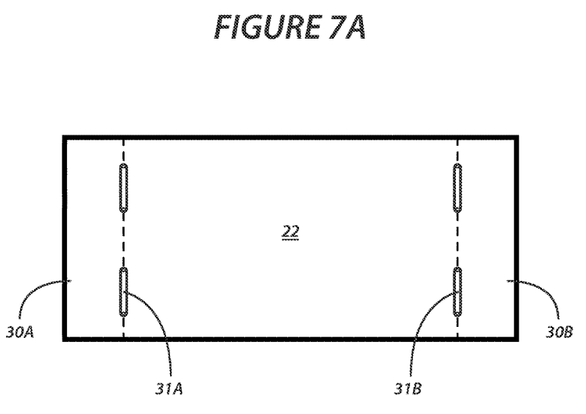
FIGS. 7A and 7B are top perspective views of an aerial-ladder truck bed with a plurality of bed extensions extending therefrom and collapsible lateral surfaces in an open position.
Figure 7B:
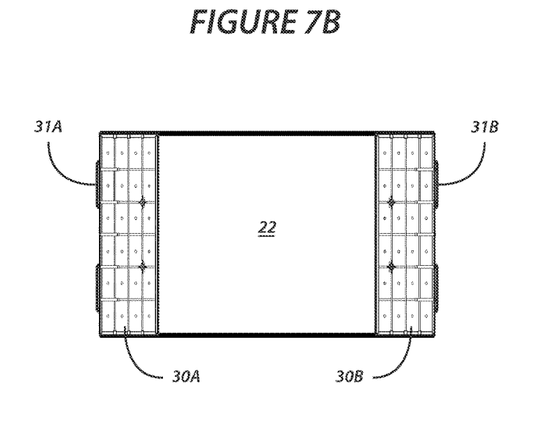

FIGS. 7A and 7B are top perspective views of collapsible lateral surfaces 30A, 30B in open and closed positions, respectively. As shown, the collapsible lateral surfaces 30A, 30B may assume an open or closed position via set of hinges 31A, 31B. Advantageously, when the collapsible lateral surfaces 30A, 30B are in the open position (FIG. 7A), the surface area of the tailgate 22 is increased which provides a truck operator additional space to move on the truck bed to load and unload cargo thereon and therefrom the carrier. Collapsible lateral surfaces 30A, 30B, when in an open position, may increase the width of the tailgate 22 by four to ten feet in some embodiments.

For example, the width of each collapsible lateral surface 30A, 30B may in the range of 2-5 feet. However, the length of each collapsible lateral surface may be in the range of 4-6 feet. In addition, when the aerial-ladder truck needs to travel, the collapsible lateral surfaces 30A, 30B may be closed (see FIG. 7B) such that the tailgate 22 may be placed in a closed position to prevent items on the truck bed from falling therefrom.

Figure 8:
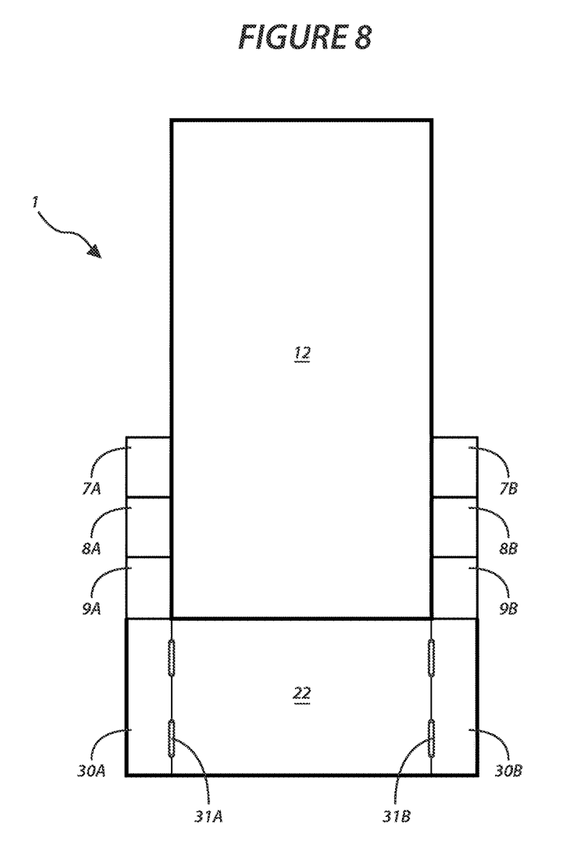
FIG. 8 is a top perspective view of an aerial-ladder truck bed with a plurality of bed extensions extending therefrom and collapsible lateral surfaces of a tailgate component of the truck bed in an open position.

FIG. 8 is a top perspective view of an aerial-ladder truck 1 with a pair of bed extensions extending therefrom and a pair of collapsible lateral surfaces 30A, 30B in an open position coupled to the tailgate component 22 of the truck bed 12. Notably, FIG. 8 shows the extended area that the bed extensions 7A, 7B, 8A, 8B, 9A, 9B, (collectively bed extensions 7, 8, 9) tailgate 22, and collapsible lateral surfaces 30A, 30B provide for a truck operator to move on the back end of an aerial-ladder truck consistent with the present disclosure.

In some embodiments, the bed extensions 7, 8, 9 extend at least two feet from the truck bed 12. However, the present disclosure is not limited thereto and may extend a distance that is longer or shorter depending upon the length of the bed extensions. In other embodiments, bed extensions 7, 8, 9 may have a ladder-like configuration with cooperating and slidably coupled platforms to increase the length that the bed extensions extend from the truck bed 12.

In addition, when the collapsible lateral sides are in an open position, as shown in the figure, they are adjacent to at least one of the bed extensions 7, 8, 9 such that a truck operator has a continuous area to maneuver on the back of the aerial-ladder truck for loading, unloading, etc.

This disclosure is directed to industrial trucks, and in particular to aerial ladder trucks with bed extensions. It will be understood by those having ordinary skill in the art that the present disclosure may be embodied in other specific forms without departing from the spirit and scope of the disclosure disclosed. In addition, the examples and embodiments described herein are in all respects illustrative and not restrictive. Those skilled in the art of the present disclosure will recognize that other embodiments using the concepts described herein are also possible.

The invention claimed is:

1. An aerial-ladder truck, comprising:
a cab at front thereof and a truck bed at a rear thereof;
wherein the truck bed has a front end portion and a back end portion, the back end portion having at least one bed extension that is slidably coupled in a transverse direction to the back end portion of the truck bed;
wherein when the at least one bed extension is engaged, the width of the truck bed increases by a length that the at least one bed extension extends from the back end portion of the truck bed;
a ladder turret provided to the truck bed to pass there through;
an extensible post fixedly passing through the ladder turret and standing upright, the height of a top thereof being adjustable;
an extensible ladder having a rear end connected to the top of the extensible post by a first hinge shaft so that an angle of the extensible ladder relative to the truck bed thereof is changeable, and a moving bucket provided at the top of the extensible ladder;
an angle adjusting cylinder for changing the angle of the extensible ladder; and
a tailgate component pivotably coupled to said back end portion of said truck bed between an open and a closed position; wherein, a pair of collapsible lateral surfaces extends pivotably from said tailgate component, when said tailgate component is in said open position.

2. The aerial-ladder truck of claim 1, wherein the tailgate component includes a plurality of cavities therein.

3. The aerial ladder truck of claim 1 further comprising a door stopper which can be extended from the truck bed to provide support for the tailgate component when open.

4. The aerial-ladder truck of claim 1, wherein the at least one bed extension includes a bed extension on both lateral sides of the truck bed.

5. The aerial-ladder truck of claim 1, wherein the at least one bed extension includes three bed extensions on a first side and a second side of the truck bed.

6. The aerial-ladder truck of claim 5, wherein each bed extension can be extended independent of each other.

7. The aerial-ladder truck of claim 1, wherein the at least one bed extension includes a locking mechanism wherein when engaged, allows the at least one bed extension to extend from a side of the truck bed, and when disengaged, restricts the at least one bed extension from extending from the side of the truck bed.

8. The aerial-ladder truck of claim 7, wherein the locking mechanism includes a set of pins.

9. The aerial-ladder truck of claim 1, wherein the at least one bed extension includes a handle for engaging the at least one bed extension.

10. The aerial-ladder truck of claim 1, wherein the at least one bed extension includes a plurality of ridges disposed on a top surface thereon.

11. The aerial-ladder truck of claim 1, wherein the angle-adjusting cylinder has a rear end connected at the front of the top of the extensible post by a second hinge shaft and a front end connected to the bottom of the extensible ladder by means of a third hinge shaft.

12. The aerial-ladder truck of claim 1, wherein the at least one bed extension is adjacent to a rear end of the truck bed.

13. The aerial-ladder truck of claim 1, wherein when engaged, at least one expander surface of the bed extensions extends two feet from an edge of the truck bed.

14. An aerial-ladder truck, comprising:
   a cab at a front thereof and a truck bed at a rear thereof;
   wherein the truck bed has a front end portion and a back end portion, the back end portion having at least one bed extension that is slidably coupled in a transverse direction to the back end portion of the truck bed;
   wherein when the at least one bed extension is engaged, the width of the truck bed increases by a length that the at least one bed extension extends from the back end portion of the truck bed;
   a tailgate component pivotably coupled to said back end portion of said truck bed between an open and a closed position; wherein, a pair of collapsible lateral surfaces extends pivotably from said tailgate component, when said tailgate component is in said open position;
   a door stopper which can be extended from the truck bed to provide support for a tailgate when the tailgate is open;
   a ladder turret provided to the truck bed to pass therethrough;
   an extensible post fixedly passing through the ladder turret and standing upright, the height of a top thereof being adjustable;
   an extensible ladder having a rear end connected to the top of the extensible post by a first hinge shaft so that an angle of the extensible ladder relative to the truck bed is changeable, and a moving bucket provided at the top of the extensible ladder; and
   an angle adjusting cylinder for changing the angle of the extensible ladder relative to the truck bed.

15. The aerial-ladder truck of claim 14, wherein the at least one bed extension comprises aluminum.

16. The aerial-ladder truck of claim 14, wherein the length of the at least one expander surface of the at least one bed extension is in the range of 2-5 feet.

* * * * *